United States Patent [19]

Rethorst

[11] Patent Number: 4,483,497
[45] Date of Patent: Nov. 20, 1984

[54] WIDE-BODY SUPERSONIC AIRCRAFT

[76] Inventor: Scott C. Rethorst, 1806 Foothill St., South Pasadena, Calif. 91030

[21] Appl. No.: 324,653

[22] Filed: Nov. 24, 1981

Related U.S. Application Data

[63] Continuation of Ser. No. 068,464, Aug. 21, 1979, abandoned, which is a continuation-in-part of Ser. No. 747,505, Dec. 6, 1976, Pat. No. 4,168,044, which is a continuation-in-part of Ser. No. 584,635, Jun. 6, 1975, Pat. No. 4,008,866, which is a continuation-in-part of Ser. No. 342,151, Mar. 16, 1973, Pat. No. 3,904,151.

[51] Int. Cl.$^3$ .................. B64C 30/00; B64D 27/18
[52] U.S. Cl. .................. 244/15; 244/1 N; 244/119; 244/53 R; 244/207
[58] Field of Search .......... 244/15, 207, 1 N, 201, 244/119, 117, 74, 45 R, 53 R, 35 R, 34 A, 55, 134 R; 239/265.11, 265.19, 102

[56] References Cited

U.S. PATENT DOCUMENTS

| | | | |
|---|---|---|---|
| Re. 24,917 | 12/1960 | Attinello | 244/207 |
| 2,891,740 | 6/1959 | Campbell | 244/15 |
| 2,950,879 | 8/1960 | Smith | 244/201 |
| 2,967,034 | 1/1961 | Eyre | 244/119 |
| 3,051,413 | 8/1962 | Pouit | 244/207 |
| 3,055,614 | 9/1962 | Thompson | 244/15 |
| 3,065,932 | 11/1962 | Herrmann | 244/15 |
| 3,211,401 | 10/1965 | Denning et al. | 244/74 |
| 3,314,629 | 4/1967 | Rethorst | 244/1 N |
| 3,327,970 | 6/1967 | Sanger | 244/53 R |
| 3,391,884 | 7/1968 | Carhartt | 244/1 N |
| 3,535,882 | 10/1970 | Tizio et al. | 244/73 R |
| 3,576,300 | 4/1971 | Palfreymann | 244/36 |
| 3,637,042 | 1/1972 | Raynes | 239/265.13 |
| 3,737,119 | 6/1973 | Cheng | 244/55 |
| 3,756,542 | 9/1973 | Berfin | 244/15 |
| 3,785,593 | 1/1974 | Von Ohain et al. | 244/207 |
| 3,815,848 | 6/1974 | Alperin | 244/1 N |
| 4,168,044 | 9/1979 | Rethorst | 244/1 N |

FOREIGN PATENT DOCUMENTS 761077  11/1956  United Kingdom ................ 244/130

OTHER PUBLICATIONS

Liepmann and Roshko, "Elements of Gas Dynamics", 1957, pp. 126-130.

*Primary Examiner*—Galen L. Barefoot
*Attorney, Agent, or Firm*—Christie, Parker & Hale

[57] ABSTRACT

This invention is an improvement of my system for supersonic aircraft which provides the required angular momentum reaction to the continuous generation of new lift circulation by vorticity in lieu of dissipative shock waves. This new system relocates the propulsive jet forward utilizing its excess energy to generate this vorticity in a planar sheet below the wing acting as a pressure shield, which continues downstream beyond the wing trailing edge as a vortex flap simulating an extended wing chord. The present invention provides mechanical vortex generating means to augment this free surface mechanism in cases where the jet velocity is insufficient. This invention also incorporates a wide-body fuselage above this pressure shield, and provides further system improvement in propulsion/wing integration.

20 Claims, 16 Drawing Figures

WIDE-BODY SUPERSONIC AIRCRAFT

CROSS REFERENCE TO RELATED APPLICATIONS

This is a continuation division of application Ser. No. 06/068,464 filed Aug. 21, 1979, now abandoned which in turn is a continuation-in-part of my co-pending application Ser. No. 747,505, filed Dec. 6, 1976, now U.S. Pat. No. 4,168,044, which is a continuation-in-part of Ser. No. 584,635, filed June 6, 1975, now U.S. Pat. No. 4,008,866, which in turn is a continuation-in-part of Ser. No. 342,151, filed Mar. 16, 1973, now U.S. Pat. No. 3,904,151.

BACKGROUND OF THE INVENTION

A basic system to reduce the sonic boom created by supersonic aircraft was disclosed in my U.S. Pat. No. 3,314,629 issued Apr. 18, 1967, providing a converging-/diverging nozzle emitting a supersonic jet of fluid aft below the undersurface of the supersonic wing. Thereafter a series of applications was filed employing the underwing energized jet of fluid apart from the wing to recover the energy normally wasted in the shock wave system into useful work by transforming the compression into vorticity. The initial U.S. Pat. of this series was No. 3,904,151, issued Sept. 9, 1975, disclosing an aircraft wing system comprising an underwing manifold/nozzle assembly extending essentially the entire span of the wing and shaping the nozzle to emit this jet of fluid aft as a sheet in an underexpanded manner, with a pressure greater than atmospheric. The opposing perturbation velocities on the interface between the underwing compressing air stream and the energized layer below generate negative (counterclockwise) vorticity, which in a supersonic flow provides an upwash downstream, increasing the pressure on the undersurface enabling the wing to operate at a lesser angle with reduced drag. My subsequent improvement U.S. Pat. No. 4,008,866, issued Feb. 22, 1977, specified the forward portion of the wing undersurface as concave, concentrating most of the compression in a short interaction region near the leading edge, corresponding to the short expansion region of the underexpanded jet. This structure locates the energy transformation mechanism under the forward part of the wing, leaving the aft part of the wing available for energy recovery. My latest improvement application No. 747,505 filed Dec. 6, 1976, now U.S. Pat. No. 4,168,044 accordingly reflects the aft portion of the wing upward so as to benefit from the downstream upwash vortex field, achieving the pressure required for lift on the underside of this aft wing portion at a lesser angle with reduced drag. This streamwise series of functions specifies the wing undersurface as concave, convex, and concave sequentially in the flow direction, thus corresponding to the upper element of a planar supersonic nozzle. The jet manifold and its continuing vortex assembly below comprise the lower surface of this nozzle, acting as a pressure shield within the wing chord and a vortex flap aft of the wing trailing edge.

The underwing jet sheet will have an inertia or resistance to downward deflection in proportion to the square of its velocity. A jet velocity in excess of the flight velocity is required for thrust, but the magnitude of this excess is limited by efficiency considerations, which will vary in differing aircraft applications. Thus in some installations where a large excess jet velocity is provided, the jet will have sufficient stiffness to remain essentially horizontal, and all of its energy can be provided in the form of velocity, which will generate the required excess of vorticity on the upper interface within the wing chord length. In cases where a large excess jet velocity is not provided, the stiffness may still be sufficient because of restrictions on pressure transmission through the rotating vortex structure. Nevertheless, cases may arise where the stiffness is insufficient for the jet to remain horizontal and instead it would be deflected downward with the underwing gap flow. In such a case the velocity retardation above and below the jet would be the same, and the vorticities in the upper and lower interface layers would be of equal magnitude and opposite sign, thus failing to provide the net vorticity reaction to the flow downturn. In such cases further measures may be required to ensure generation of the required reactive vorticity to obviate the dissipative shock wave system.

BRIEF SUMMARY OF THE PRESENT INVENTION

The present invention normally provides a fully expanded internal shape for the jet nozzle so as to emit its excess jet energy at atmospheric pressure and with the greatest jet velocity possible to maximize the velocity differential across the jet interface and hence the vorticity production.

However, the present invention provides a further improvement in this energy recovery system by incorporating mechanical vorticity augmentation, thereby ensuring generation of the required reactive vorticity independent of the jet velocity and its downward deflection. These auxiliary vortex generation provisions are primarily integrated with the underwing jet manifold system, still using the excess energy of the jet in the form of pressure or velocity as required for the driving mechanism, but employing additional structure to force generation of the required reactive vorticity.

This invention also includes a wide-body fuselage, comprised of a plurality of cylindrical sections joined on their sides, arranged so that its forward compression is shielded by the underwing vortex assembly and its aft expansion is absorbed into a jet augmentation system provided by an aft engine and the horizontal stabilizer.

Further system improvements are incorporated in the wing/propulsion integration, including a high pressure lateral duct to feed gas to the jet nozzle uniformly over its span.

BRIEF DESCRIPTION OF THE DRAWINGS

The foregoing and other readily apparent features of my present invention will be better understood by reference to the following more detailed specification and accompanying drawings wherein.

DETAILED DESCRIPTION OF THE PREFERRED EMBODIMENT

In the following paragraphs like numbers refer to the same or similar items from figure to figure.

The basic elements of the wing/jet system of the present invention are illustrated in the cross sectional view of FIG. 1, providing a supersonic wing 20 compressing a layer of air 21 thereunder, which extends downward to an energized jet sheet 22 below emitted from a forward located manifold/nozzle 23. This nozzle 23 is provided with an internal shape such as to expand the jet sheet 22 substantially to atmospheric pressure.

The jet sheet 22, comprised of air energized by the engine fan $39f$ to provide a propulsive force is emitted with a velocity greater than the free stream 24, or the flight velocity. This increased velocity of the jet sheet 22 generates a layer of negative (counterclockwise) vorticity on the upper jet interface 25 by mixing with the underwing flow 21, and a layer of positive (clockwise) vorticity on the lower jet interface 26 by mixing with the outer flow 30. These two basic vortex sheets are of equal magnitude and opposite sign, as represented by bold vectors $25b$ and $26b$ respectively of FIG. 1, and hence add zero net vorticity to the flow.

The supersonic wing 20 has an undersurface concave, convex, and finally concave in the streamwise direction. The forward section $20f$ is concave downward, comprising the compression section. The center section $20c$ is convex, providing a throat to the underwing flow. The aft section $20a$ is again concave downward, comprising the energy recovery section.

Under the forward compression section $20f$, the underwing flow 21 is decreased in velocity due to the compression and generation of pressure. Hence its interaction and mixing with the higher velocity jet sheet 22 below generates an additional negative vorticity contribution $25a$ on the upper interface 25.

Figure 1:
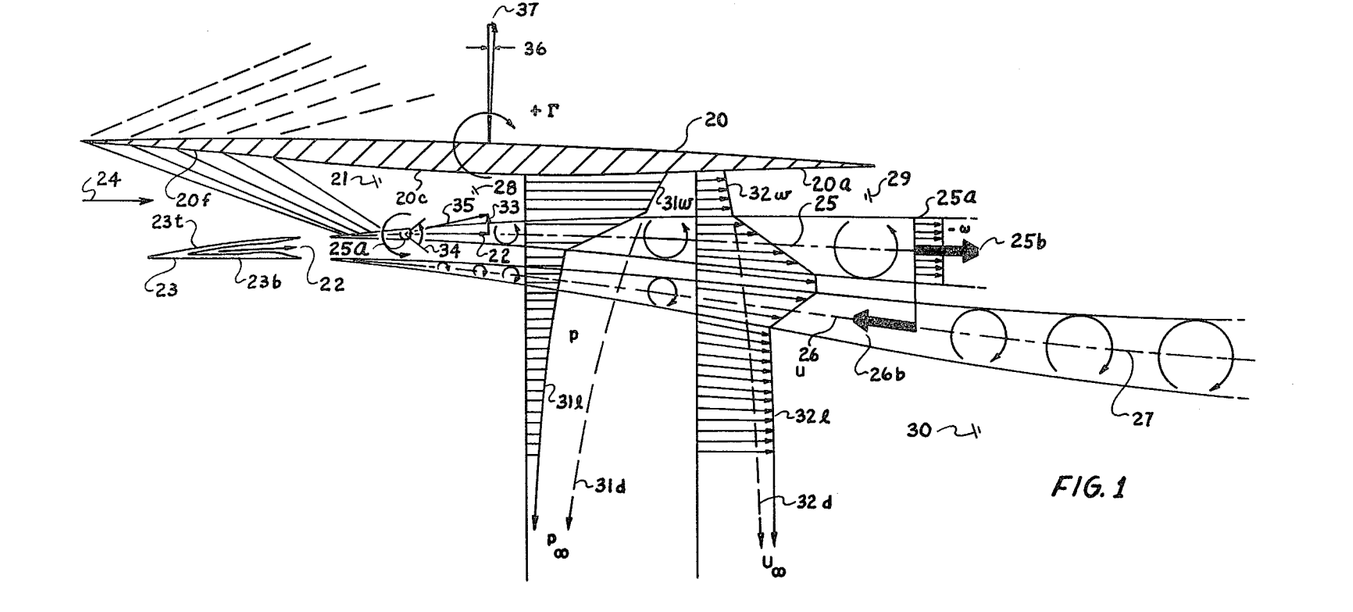
FIG. 1 is a cross sectional view of the wing and jet manifold emitting an energized jet thereunder, comprising a planar converging/diverging nozzle, showing the vertical profiles of the flow properties at the throat thereof.

FIG. 1 illustrates the basic case where the jet velocity 22 is sufficient to resist significant downward deflection, thereby generating the excess reactive vorticity $25a$ on the upper jet interface through the difference in the jet and gap velocities. When the jet velocity 22 is not sufficient to provide the stiffness required for this vorticity generation by free surface velocity differentials alone, mechanical vorticity augmentation provisions will be incorporated, primarily in the manifold/nozzle 23, as described later in this section.

Under the center throat section $20c$ a change in the flow gradient occurs smoothly, making a transition from the increasing pressure and decreasing velocity of the forward compression section $20f$ to a decreasing pressure and increasing velocity of the aft recovery section $20a$.

Under the aft expansion section $20a$, where the wing undersurface is reflexed upward, the flow expands, benefitting from the increased pressure due to the energized vorticity $25a$ generated on the interface 25, maintaining the pressure required for lift at a lower angle of attack in this region, producing less drag, and with some portions providing a thrust component.

The increased pressure $31w$ generated on the wing undersurface 20 by the vortex energy recovery mechanism may also be regarded as an increase in circulation about the wing. It is well known in fluid mechanics, as enunciated by Thomson's theorem, that if a flow is initially irrotational, it must remain irrotational thereafter. Thus when vortices are generated in the flow, an equal and opposite vorticity generation is required so that the total vorticity, initially zero, remains zero at all times. Hence from another point of view, the increased pressure on the underside of the wing 20 may be represented as an increased positive circulation (clockwise) generated around the wing itself in reaction to the additional negative (counterclockwise) vorticity 25a generated on the jet interface 25.

Figure 2:
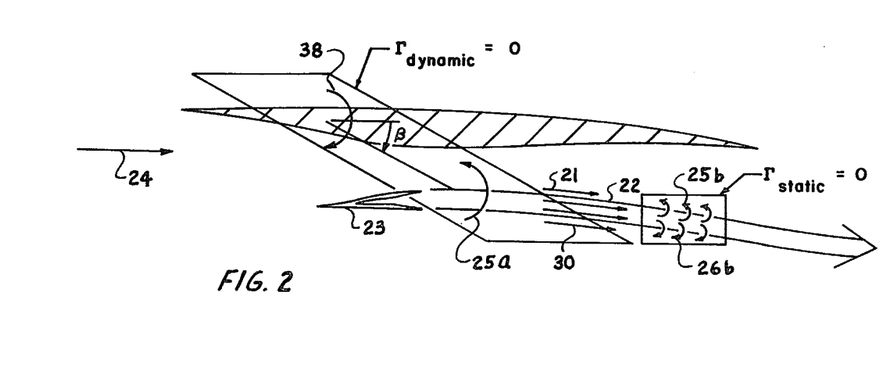
FIG. 2 is a schematic sectional view of the wing and energized jet thereunder, illustrating both (a) the equal and opposite basic vorticity components on the upper and lower interfaces of the jet due to its higher velocity with respect to the free stream flow, and (b) the additional negative (counterclockwise) vorticity developed on the upper interface due to the decreased velocity under the wing and the positive (clockwise) circulation developed around the wing in reaction thereto.

This overall system operation in terms of circulation Γ is illustrated schematically in FIG. 2. The equal and opposite basic vorticity contributions 25b and 26b, on the upper and lower interfaces of the jet 22 respectively, due to its higher velocity, in effect cancel and provide zero net effect. The additional negative vorticity 25a on the upper interface 25, on the other hand, requires an equal and opposite reaction, which is of course the additional positive circulation 38 around the wing 20, corresponding to the pressure 31 generated by the vortex assembly as described.

As shown in FIG. 1, the jet sheet 22 and the two basic vortex layers 25 and 26, as well as the additional vortex contribution 25a, all continue as an assembly aft of the manifold/nozzle 23. This assembly, and particularly its interface vortex layers, is also given the additional designation of a vortex flap 27, primarily in its role of providing a pressure shield. Within the wing chord, the upper vortex layer, comprising both its basic portion 25 and its additional portion 25a, sustains a vertical pressure gradient and thus performs the pressure shield or vortex flap role. Aft of the wing trailing edge, the lower vortex layer 26, by then deflected downward somewhat by the high underwing pressure, sustains a pressure gradient which has both vertical and horizontal components as it is deflected upwards back to a horitzontal direction, and thereby performs the role of the vortex flap 27 in this downstream region. The pressure sustaining mechanism of the vortex flap 27 in both the underwing and downstream regions will now be described in detail, referring again to FIG. 1.

In the gap 21 immediately below the wing 20 the velocity of the free stream 24 is initially reduced in a forward perturbation velocity by diffusing a portion of its velocity energy into pressure. In the aft part of this gap compression energy is recovered by expansion back into velocity. Below this gap appearing in sequence are the three elements of the jet/vortex flap assembly 27, namely (1) the upper vortex sheet 25/25a, (2) the jet 22 itself, and (3) the lower vortex sheet 26. The two vortex sheets of opposing sense of rotation are generated by the differentials in velocity on the upper and lower jet interfaces.

The upper vortex sheet 25/25a is of particular interest. It is generated by the velocity differential between the retarded flow 21 in the gap above and the higher energy jet 22 in the layer below. Furthermore, this counterclockwise (negative) vorticity transports a portion of the high velocity jet 22 upwards where it is diffused and compressed by the higher pressure in the gap flow above. This deformation, together with the speed of sound, limits transmission of pressure through this vortex layer, providing a vertical shield to (1) contain the high pressure in the gap flow above, and (2) serve as a conduit to transmit the pressure aft, providing a longer effective chord wing. Again this compression energy in the vortices is recovered into angular velocity at the wing trailing edge, as there is no external force to constrain the compression downstream thereof.

The lower vortex sheet 26 is generated by the velocity difference between the jet 22 and free stream 30 below. Since the jet is initially horizontal, this lower vortex sheet does not at first encounter any positive pressure below and hence plays no role in the region immediately under the wing. However, aft of the wing, where the jet assembly 27 has by then been deflected downward by the higher gap pressure, the free stream below deforms the clockwise (positive) vorticity of this lower vortex sheet to generate a converse pressure shield, providing gradients to transmit a portion of the aircraft weight to the fluid aft of the wing trailing edge. These lower vortices 26 thus serve as a mechanism to physically transport compression energy downstream, where it is gradually transferred to the outer flow in terms of work done as it generates downward momentum in a greater mass of fluid beyond the wing itself.

Thus the vortex compression is selectively confined to those vortices exposed to an external force. In the wing region there is the external force of the wing above and also the inertia force of the outer flow below. Initially the former dominates and compresses the upper regions of vortices in the upper vortex layer, but the latter gains and takes over completely as the wing effect vanishes at the trailing edge. Downstream of the wing the vortex compression is confined entirely to the lower portion of the vortices in the lower vortex layer, balancing the pressure exerted by the outer flow.

The upper vortex sheet 25/25a will sweep fluid up against the wing surface 20, where the boundary downturn generates pressure. The lower vortex sheet sweeps fluid down, where there is no wing and no pressure generated. So the upper sheet operation is not compromised by the lower sheet in the wing region, nor is the lower sheet effect compromised by the upper sheet aft of the wing.

Figure 3:
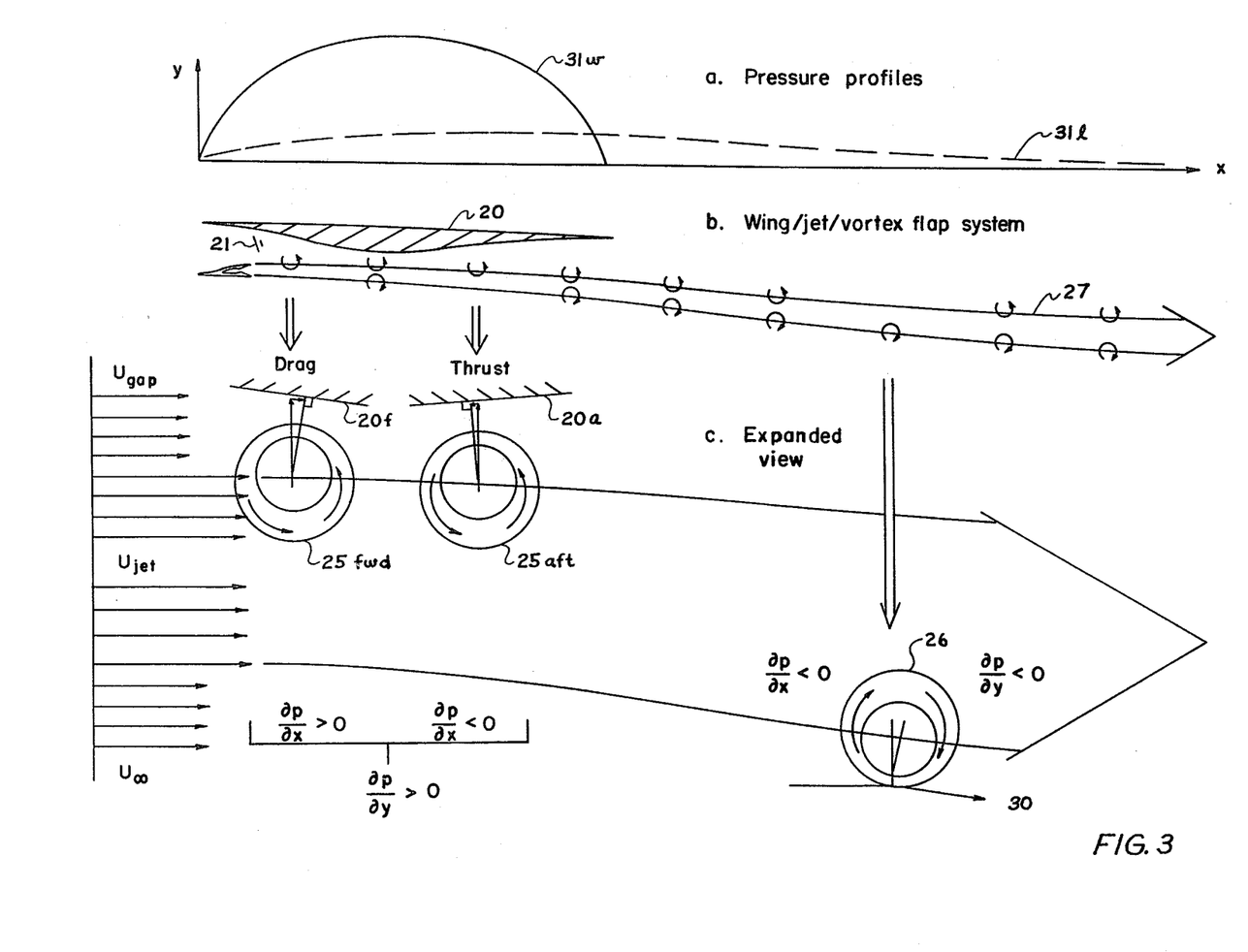
FIG. 3 is a schematic view of the wing and jet/vortex layer assembly, including an expanded view of deformed vortices both under and aft of the wing, together with profiles of pressure under both the wing and vortex flap.

Further insight into this pressure shielding mechanism is provided by the schematic illustration of FIG. 3. Here FIG. 3(b) illustrates the wing/jet/vortex flap system, showing the upper and lower vortex layers on the jet sheet. Typical vortices are then shown on the jet sheet interfaces in the expanded view of FIG. 3(c) below. Illustrated under the wing on the upper jet interface 25/25a are both (1) a forward vortex 25fwd with its compression axis normal to the downward sloping forward surface 20f, providing a drag component, and (2) an aft vortex 25aft with its compression axis normal to the upward sloping aft surface 20a, providing a thrust component. Also shown downstream of the wing trailing edge on the lower jet interface is a typical vortex 26 with its compression axis downward, bisecting the deflected outer stream 30 below. The pressure gradients through the vortex layers associated with these compression features are also shown in FIG. 3(c). Finally, FIG. 3(a) above illustrates both (1) the high pressure 31w on the wing undersurface, and (2) the lower magnitude pressure 31l on the jet/vortex flap assembly undersurface, extending far downstream.

Under the wing, the counterclockwise rotating vortices in the upper vortex layer 25/25a are deformed by the weight of the wing above, providing upswept diffusers which compress the flow as it rotates within the vortex, generating an increased density in its upper extent, providing a vertical pressure gardient. The degree of pressure shielding is a function of the physical parameters. But clearly an absolute shield is not provided, and some of the pressure is transmitted through the vortex layer, deflecting the jet below downward to some extent. If the vortices generated a complete shield there would be no deflection downward of the jet, and if the vortices provided no pressure shield or gradient, then the jet would be deflected downward as under a conventional uniform flow wing. The actual intermediate case imposes a lesser downward deflection of the jet, to a degree dependent upon the jet velocity ratio, jet thickness, its proximity to the wing, and other parameters.

When the jet layer is deflected downward, the clockwise rotating vortex layer 26 on its lower interface is similarly pressed down. This in turn pushes the free stream 30 below downward, increasing the pressure in this outer field. At the trailing edge of the wing, the pressure generated in the gap 21 immediately under the wing returns to ambient through expansion in the downstream portion of the gap flow nozzle, and the rate of deflection of the lower vortex flap reaches a maximum. At this point, the energy below the jet consists of two terms, namely (1) linear kinetic energy associated with downward momentum already imparted to the external field, and (2) rotational and compression energy in the vortices of the lower vortex sheet.

The downward deflection of the free stream 30 below compresses the vortices in the lower interface layer 26 on their bottoms, the converse of those in the upper interface layer, as shown in FIG. 3(c). These downswept vortices in the lower interface layer transport compression energy aft of the wing trailing edge. They are gradually deflected from their downward path back to the horizontal, but in the process continue to deflect the outer stream downward, thereby exchanging their energy of rotation and compression into linear kinetic energy in generating downward momentum in the outer flow over an extended chord region aft of the wing itself.

Returning now to the more definitive illustration of FIG. 1, the spanwise manifold/nozzle 23 outside shell is provided with a zero angle of attack on its flat bottom surface 23$b$ and a concave upwards top surface 23$t$, corresponding to the concave downward undersurface of the compression section 20$f$ of the wing above in its forward region. The jet sheet 22, together with its surface layers of vorticity as described, thereafter combines with the convex center section 20$c$ of the wing 20 above to form a throat 28 in the flow. The increasing pressure in the underwing flow 21 due to the additional vorticity 25$a$ deflects the jet stream 22 and its vortex surface layers downward, which in conjunction with the upward reflexed aft section of the wing undersurface 20$a$, provides an expansion region downstream of the throat 28 for the channel flow 21.

Thus the concave, convex, concave curvature of the undersurface of the wing 20, combined with the reflecting concave, convex, concave curvature of the jet/vortex layer assembly below, provides a planar converging/diverging nozzle-like boundary 29 in the flow.

The vertical variation of the flow properties at the throat section 28 of this planar nozzle 29 is also shown in FIG. 1, illustrating the flow in the compression layer 21, extending down through the upper vortex shield layer 25/25$a$ and into the flow field 30 below. These flow profiles illustrate the vertical variations in particular of (a) the pressure p 31 and (b) the velocity u 32. The additional vorticity component $\omega$ 25$a$ is also shown.

The vorticity profile $\omega$ 25$a$ illustrates the additional negative vorticity generated on the upper jet interface 25. The bold vectors 25$b$ and 26$b$ represent the equal and opposite sign basic vorticity contributions on the upper and lower surfaces respectively of the jet due to its higher velocity.

The pressure profile p 31 illustrates the vertical pressure gradient through the underwing flow field, and in particular the increase in pressure 31$w$ in the compression layer 21 adjacent the underside of the wing 20. The substantial pressure gradient shown through the upper vortex layer 25/25$a$ is sustained by the asymmetric nature of its internal rotational structure due to compression of the fluid and the speed of sound, providing a vertical pressure shield. The lesser pressure rise 31$l$ below the jet 22 achieved by this pressure shield is shown solid as compared with the usual profile 31$d$ shown dashed.

The velocity profile u 32 illustrates the effect of the forward wing section 20$f$ in reducing the velocity 32$w$ on its underside in the compression layer 21$f$. The increased velocity in the jet 22 employs viscosity on its interface to generate the vorticity corresponding to the substantial velocity gradient shown through the upper jet interface 25. The lesser velocity gradient through the lower boundary 26 of the jet is also illustrated, and the increased total velocity 32$l$ below the jet provided by the vortex perturbation increment is shown solid for comparison with the usual profile 32$d$ shown dashed.

The dashed and solid profiles shown in FIG. 1 illustrate the benefit derived from negative vorticity generation. Without the vorticity, the jet 22 would be deflected downward to a greater extent by the pressure generated from the wing 20. The outer flow 30 beneath the jet 22 would then in turn be subjected to greater downward deflection. This greater downward deflection is associated with higher static pressures (greater compression) and greater velocity decrease (as depicted by dashed lines on the pressure and velocity profiles). Thus, vorticity generation 25$a$ on the upper jet interface 25 limits or reduces the compressive field produced immediately under the lifting wing, corresponding to the extended action of the vortex assembly aft of the wing as a vortex flap 27.

This longer effective chord/reduced angle wing system spreads the downward momentum producing the lift over an increased mass of air, leaving less energy in the wake, corresponding to a reduced drag. Thus a major portion of the energy in the vortex formation is recovered into useful work, and any residual energy is retained as vorticity in the flow stream at the aircraft altitude, where it will eventually decay into heat, precluding its transport towards the ground to generate a sonic boom.

The net result of this mechanism is to employ the upper vortex layer 25/25$a$ as a pressure shield, providing in combination with the wing undersurface 20 above a planar nozzle, generating the pressure in the stream required for lift, but thereafter recovering the pressure energy back into velocity.

The additional vorticity 25$a$ generated to provide this shield proceeds downstream under the wing with the flow, combining into a series of discrete rollers, all with a negative sense of rotation about spanwise axes, growing in an ordered manner. In a supersonic flow such a negative vortex 25$a$ provides an upwash 33, reflecting the speed of sound restriction of its contribution to its downstream Mach cone 34. This upwash 33 adds to the stream velocity 22 to comprise an upward inclined flow 35 providing the increased pressure 31$w$ on the underside of the wing, enabling the wing 20 to operate at a lesser angle 36 with reduced drag 37. The increase in underwing pressure developed by this mechanism provides a major alteration in the entire flow field, which follows from the severly altered gradients of the flow properties generated by rotation in the underwing vortex assembly as described.

This ability of a supersonic vortex layer to sustain a pressure gradient at first appears remarkable. The more familiar subsonic vortex sheet exhibits no such property. In fact, for incompressible flow, a pressure gradient can be sustained only by the centrifugal force of curved flow. But at supersonic speeds a pressure gradient in a stream can be sustained also by changes in density and velocity due to the domain restrictions of the speed of sound the converse variation of these properties at supersonic speeds.

The shock wave itself is the most familiar example, where the pressure gradient is so severe as to be regarded as a discontinuity. The flow behind a normal shock has no change in direction, and the pressure gradient is sustained solely by changes in density and velocity. Thus Newton's second law, requiring a change in momentum to balance the force or pressure, is satisfied in incompressible flow by the product of a constant mass times the rate of change of velocity. But for compressible flow the change in momemtum requires adding another term, namely the product of the velocity times the rate of change of density. This second term thus provides pressure gradients as a common feature of supersonic flows, andthe present vortex assembly is simply a further example of this mechanism.

Thus the rotational flow in the upper vortex layer 25/25a in the underwing region is deformed by the weight of the wing above. The fluid in such a vortex on its downstream side rotating upwards against this pressure is compressed. In the case of extreme pressure a normal shock would develop and lie horizontally across this upflow. In less severe cases this compression will take the form of oblique compression waves, oriented asymmetrically to turn the fluid aft while increasing its pressure, thus providing a pressure gradient normal to the free stream direction. On the upstream side of the vortex where the vortex is rotating down away from the wing, the flow will expand, similarly providing a pressure gradient normal to the free stream direction. Thus the vortices perform the role of diffusers, transforming the excess jet velocity into pressure in the upper vortex regions, providing a vertical pressure shield.

For cruise operation at a constant altitude, the pressure or lift will be maintained constant and equal to the weight, and hence the increased pressure 31w would be used to decrease the angle of attack 36 with a corresponding reduced drag 37. The attendant reduction in wing pressure drag 37 due to the reduced angle of attack 36 can then be used to estimate the improvement in lift/drag $(L/D)_u$ ratio for the upflow wing aircraft, which can most conveniently be calculated normalized to the lift/drag $(L/D)_o$ ratio for large conventional SST aircraft, where the drag due to lift is approximately one half the total drag. This improvement in lift/drag ratio provided by the compressible vortex upwash is shown by the following expression:

$$\frac{(L/D)_u}{(L/D)_o} = \frac{2}{1 + \frac{\alpha_u}{\alpha_o}}$$

$\alpha_u \geq 0$ where
$\alpha_u$ = wing angle of attack in vortex upflow
$\alpha_o$ = wing angle of attack with no upflow The angle ratio in the above expression may be evaluated by imposing the condition of equal lift, where the upflow wing lower surface pressure is augmented by the excess jet velocity diffusion and the conventional wing is without augmentation, and equated with the aircraft weight. The angle ratio may then be expressed as $$\frac{\alpha_u}{\alpha_o} = 1 - \frac{\Delta P_s}{W/S}$$

$\alpha_u \geq 0$ where
$\Delta P_s$ = shield pressure developed by excess jet velocity diffusion
$\Delta W$ = aircraft gross weight
$\Delta S$ = aircraft wing area Development of a shield pressure $\Delta P_s$ equal to the aircraft wing loading W/S would then correspond to complete replacement of the shock system by reactive vorticity, and the lift/drag ratio would be doubled.

Figure 4:
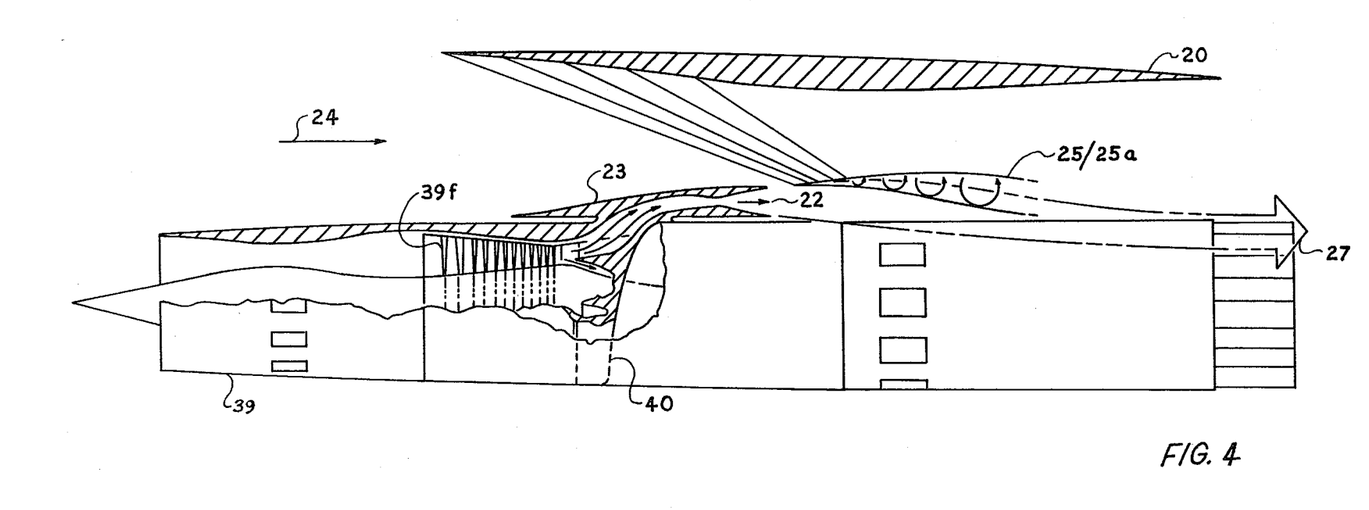
FIG. 4 is a cross sectional view of the wing and fan jet engine below located so that the fan air from its collector scroll feeds directly into the spanwise manifold.

The energized jet sheet 22 generating the vorticity transformation system described is provided by a fan jet engine 39 mounted below the wing 20 as shown in FIG. 4. The engine 39 is located so that the air compressed by its fan 39f, collected in its scroll 40, feeds directly into the manifold 23 which in turn emits the high velocity jet sheet 22, generating the vortex layer 25/25a on its upper surface as part of the vortex flap assembly 27.

It is clear that this spanwise manifold/nozzle 23 is not simply added structure, but rather a relocation of ducting from the engine pod into the wing system. In this position it serves a double purpose in providing external blown flaps at take-off and possibly afterburning for acceleration to cruise velocity. Furthermore, the fan air would normally travel through the engine in a conventional aft discharge system about the same distance as now involved in the spanwise manifold; hence the internal friction drags of the two arrangements are of the same order.

Figure 5:
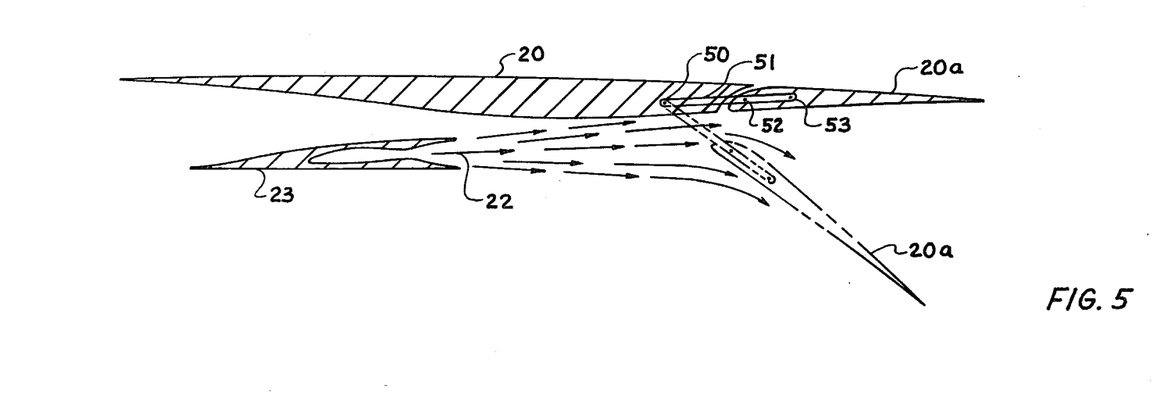
FIG. 5 is a cross sectional view of the wing with its slotted trailing edge flaps extended, illustrating the spanwise manifold and its jet flow over the flaps for lift augmentation at take-off and climb operation.

External blown slotted flaps are provided by segmenting the aft portion 20a of the wing 20 and lowering this segment 20a at take-off and landing speeds into the energized stream 22 emitted from the forward located nozzle 23, as illustrated in FIG. 5. The increased velocity of this energized stream 22 augments the lift normally obtained with trailing edge flaps, reducing the takeoff and landing ground roll distance.

Lowering of the flap 20a into the energized stream 22 is accomplished by swinging the flap 20a about a hinge point 50 located in the fixed structure of the wing 20. The flap 20a is mounted on a bar 51 affixed rigidly at points 52 and 53 on the flap 20a, so that the flap can accomplish a simple rotation about point 50 and lower into the energized stream 22 as shown in the dashed position. The increased velocity of the energized stream 22 then acts on both surfaces of the slotted flap 20a.

The flap 20a can be provided with multiple slots if desired by extending the same hinge mechanism into the flap itself. The aft portion 20a of the wing 20 would preferably have a concave lower surface, which alternatively would be flat, or convex as illustrated in FIG. 5.

The installation would appear to favor fan engines, with the hot exhaust discharged directly, and the fan air employed as the underwing sheet 22, being ducted spanwise at high pressure for discharge aft through the converging/diverging nozzle 23, as illustrated in FIG. 4. A fan air system would involve a greater mass flow and hence a higher propulsive efficiency. Furthermore, the fan air could be used dry to provide quiet lift augmentation for take-off, with remote afterburning if used at all employed only at altitude. Finally, the increased surface area of the fan air spread out as a lateral sheet should further reduce sideline noise.

The jet sheet propulsion system and compression energy recovery mechanism accordingly are well matched. At supersonic speeds the wing in generating pressure for lift unavoidably ties up additional energy in the form of compression; the propulsive system normally employs an excess jet velocity to minimize the mass flow and the corresponding machinery weight and frontal area. However, integration of this underside compression from the wing and excess velocity from the propulsion system in the vortex flap mechanism employs the mixing layer as a planar jet augmentation system, with the upward reflexed aft portion of the wing providing the surface on which the augmented pressure acts. This energy transfer both recovers the compression energy by transformation into vorticity and augments the mass of air involved in thrust to improve the propulsive efficiency.

The system disclosed incorporates many of the characteristics of an ideal self-propelled body; its transfer of energy from the jet layer to the underwing compression layer absorbs the propulsion excess of the former and avoids the velocity defect of the latter, providing in the limit zero energy discharge into the wake. Hence the overall system is synergistic.

The increased thrust due to this mixing process dues not feed upstream at supersonic speeds to act on the nozzle; instead it appears downstream as a thrust component on the back side of the upward reflexed wing.

This arrangement achieves the energy recovery benefits of a converging/diverging supersonic nozzle with the crucial distinction of providing lift. The wing 20 itself comprises the upper element of this planar nozzle and the spanwise manifold 23/vortex flap 27 comprises its lower element. The forward converging section generates an increased pressure, providing the required lift under the wing. The flow continues through a throat and expands thereafter downstream, where the pressure energy and its associated compression is recovered back into velocity at the nozzle exit or trailing edge of the wing. The wing system will then in principle have zero volume drag, recovering the compression energy associated with the volume of its component parts back into velocity.

The upper element of this nozzle, the wing itself, will have the lower surface of its aft section reflexed upwards providing a thrust component from the increased pressure. Further, the energy associated with compression due to the wing thickness, normally represented as drag due to volume, is proportional to the thickness ratio squared. The present system, by avoiding this volume drag, relaxes the usual constraints on this ratio, permitting use of a thicker wing having lower drag, less structural weight, more fuel capacity, and reduced friction drag.

The lower element of this nozzle begins with the spanwise manifold, which has a flat bottom and concave top, generating its volume compression entirely in a distributed field above. This balances the similar isentropic compression field generated by the concave downward wing, enabling recovery of this channeled compression energy downstream of the nozzle throat by expansion back into velocity. In principle, the volume drag of this spanwise manifold is obviated by recovery of its compression into velocity, and by reducing the drag of the wing above, even its own friction drag is compensated. The lower nozzle element continues downstream as the vortex flap, which sustains a pressure differential through its internal rotational structure, thereby providing a pneumatic segment to complete the lower surface of the converging/diverging nozzle, extending thereafter aft of the wing trailing edge, comprising an increased effective chord, spreading the aircraft weight downstream, transmitting downward momentum to a larger mass of air in a more efficient manner.

Figure 6:
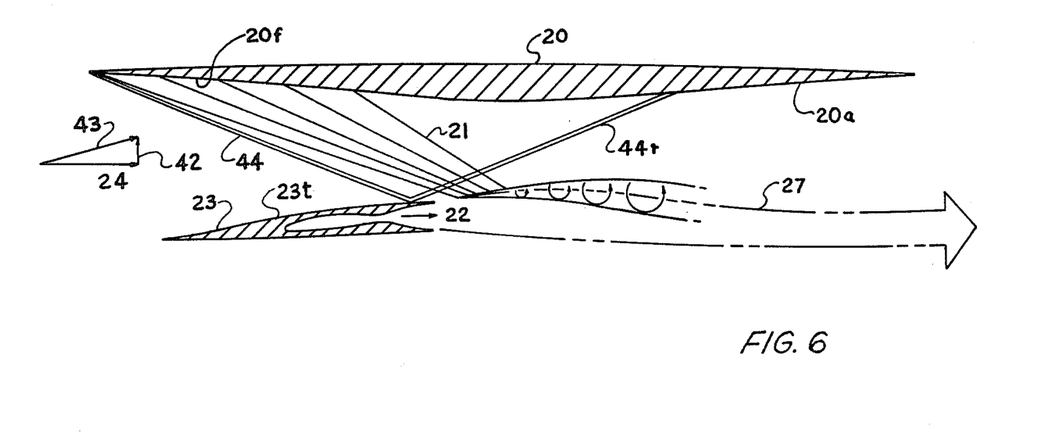
FIG. 6 is a cross sectional view of the wing and spanwise manifold, illustrating its gust alleviation capability via internal shock absorption.

The underwing jet manifold/vortex flap system furthermore serves as a unique shock absorber to alleviate the effect of atmospheric gusts, as shown in FIG. 6. The underwing jet manifold 23 is located so that its emitted jet 22 is in position to interact with the field of weak compression waves 21 generated by the forward concave underwing section 20f. In the presence of a vertical gust 42, the local flow 43 forward of the wing is inclined upwards, increasing the angle of attack 36 of the wing, generating a strong shock 44 at its leading edge turning the flow horizontal. The underwing jet manifold 23 is located and shaped so that this leading edge shock 44, which is steeper than the weak compression waves 21 due to its increased strength, is intercepted and reflected from the solid top surface 23t of the jet manifold as a further shock 44r upward against the reflexed aft portion of the wing 20a, where it is cancelled by expansion as the flow is turned parallel to this wing undersurface.

This strong shock system 44 in the underwing compression layer 21, caused by the vertical gust 42, will dissipate a portion of this excess gust energy into heat as in a conventional shock absorber, rather than allowing the energy to be transmitted as a further pressure to impose structural loads on the aircraft wing 20 and discomfort on its occupants.

Corresponding to this energy absorption in the internal flow 21 will be an upward deflection of the vortex flap 27, acting like a spring, deforming momentarily to relieve the excess external load due to the increased flow angle on its lower surface.

The propulsive jet must have an energy level greater than atmospheric to provide thrust. The velocity of this jet for supersonic operation is often at least 50% greater than cruise velocity, depending on the mass ratio employed. This increase in velocity more than adequate to match the decrease imposed by the wing on the underside compression layer. Hence the velocity differences on the upper interface 25 generating the additional vortex sheet 25a can be similar in magnitude, with half the vortex energy derived from wing compression and the other half provided by the propulsive jet. Thus the requirements imposed on the propulsion system for thrust and vortex generation are compatible.

The free surface mechanism described will normally provide the required angular momentum reaction in terms of vorticity. However, in cases where the jet velocity is not sufficient to provide the stiffness required for asymmetric vorticity generation by velocity differentials alone, auxiliary mechanical vorticity augmentation provisions are incporated to ensure production of the required reactive vorticity independent of the jet velocity and its downward deflection. These provisions are integrated primarily within the underwing jet manifold system 23, and comprise additional structure to use a portion of the jet energy to directly force generation of the required vorticity.

This additional structure may take any one of several forms, but all employing the principle of vortex generation by solid boundary modification of the jet nozzle in contrast to vorticity generation by velocity differentials alone on the free surface of the jet.

Figure 7:
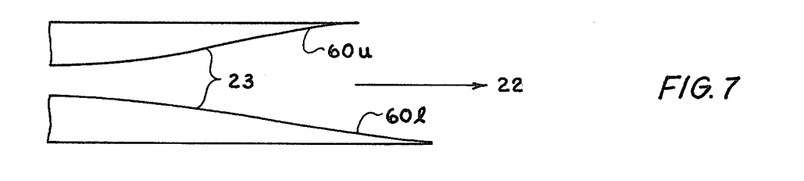
FIG. 7 is a cross sectional view of a nozzle having asymmetric lips, showing the lower nozzle lip extending further aft, providing a lower shield until the high pressure jet expands to atmospheric pressure.

Thus the vortex generator may take the form of asymmetric nozzle lips, as shown in FIG. 7, where the lower nozzle lip 60 extends further downstream than does the upper nozzle lip 60u, shielding the upper vortex layer 25a during its initial generation, thereby establishing its higher strength to provide the required pressure shield.

Figure 8:
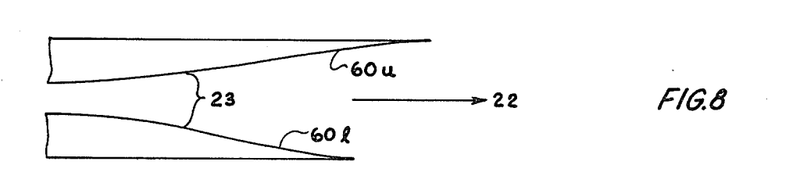
FIG. 8 is a cross sectional view of a nozzle having asymmetric lips, wherein the upper nozzle lip extends further downstream, generating a thicker boundary layer and increased vorticity on its surface.

Alternatively, the upper nozzle lip 60u could be extended further aft than the lower nozzle lip 60l, as shown in FIG. 8, providing a higher Reynolds number flow and a thicker boundary layer 25a, which would comprise an increased thickness and strength vorticity layer 25a on the upper jet interface.

Figure 9:
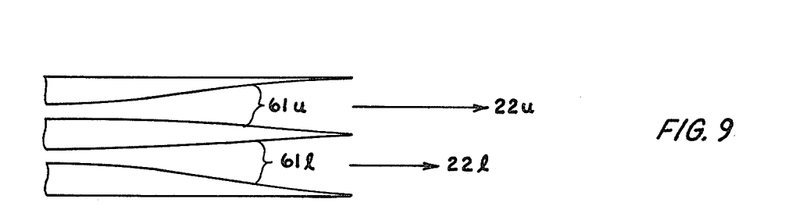
FIG. 9 is a cross sectional view of a nozzle divided into two vertically superimposed nozzles, the upper nozzle providing a more complete expansion into a higher velocity jet, and the lower nozzle providing a less complete expansion emitting a jet of higher pressure.

A further vortex generator would be comprised of two vertically superimposed nozzles, as illustrated in FIG. 9, where the upper nozzle 61u has an internal shape to provide a more complete expansion into a higher velocity jet 22u, whereas the lower nozzle 61l is shaped to provide a less complete expansion and hence a jet 22l of higher pressure. The higher velocity upper jet 22u will then produce a vorticity 25a of greater strength, and the higher pressure lower jet 22l will initially deflect the upper jet 22u upwards, assisting its resistance to downward deflection and enhancing its compression from the pressure above. This dual nozzle arrangement could also be combined with the extended lower nozzle lip 60l of FIG. 7 to restrict downward transmission of the pressure from the lower nozzle.

Figure 10:
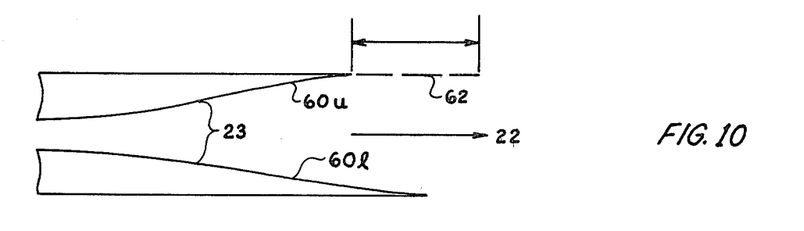
FIG. 10 is a cross sectional view of a nozzle containing a moveable blade in its upper lip, arranged to pulsate fore and aft. The aft motion would be supersonic, providing a subsonic trailing edge. A jet with a pressure greater than that of the flow above would then expand aft, upwards, and curl forward around the blade. When the blade retracts, the vortex so generated is shed into the stream. The lower lip of the nozzle has an extension to shield this increased pressure from expansion downward.

A still further vortex generating mechanism is illustrated in FIG. 10, where the upper nozzle lip 60u contains a blade 62 arranged to oscillate fore and aft. The aft motion of the blade would be at a velocity approaching that of the jet within a differential less than Mach 1, thereby providing a subsonic trailing edge. The jet 22 would be emitted with a pressure greater than the flow above, so it would expand aft, upwards, and forward around the blade, forming a vortex 25a. Thus if the jet nozzle is located forward of the compression field 20f of the wing, the jet would be discharged with a pressure greater than atmospheric; if located within the compression field 20f its discharge pressure would be greater than that of the gap flow 21. An extended lower lip 60l would prevent the pressure from going down. The blade would then osicllate forward, discharging the vortex 25a in a manner similar to a starting vortex shed from the trailing edge of a wing. Repeated oscillations of the blade would produce a sequence or array of vortices 25a in the flow, whose size and strength would be controlled by the period of motion. The unsteady blade motion would be actuated by mechanical, electrical, hydraulic, or pneumatic means, the latter being probably the most simple in tapping energy directly from the jet stream.

Figure 11:
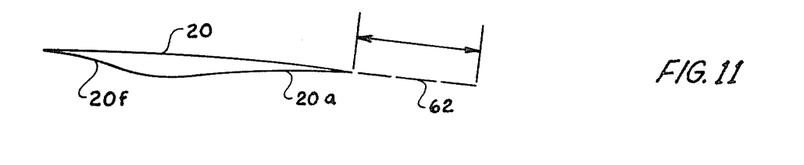
FIG. 11 is a cross sectional view of a wing of the present invention containing a moveable blade in its aft region to similarly provide a subsonic trailing edge in a pulsation sequence.

An even further vortex generating mechanism illustrated in FIG. 11 would locate the moveable blade 62 in the aft part of the wing 20a to similarly provide a subsonic trailing edge in a pulsation sequence. Such a wing-located system is less complicated, requiring no integration of the power plant. However, the compression waves generated under the forward part of the wing 20f would now be unshielded, and would generate a shock wave system as usual. Nevertheless, if the vortex array continues aft of the wing a substantial distance and sustains a pressure gradient, then the wing 20 could operate at a lesser angle of attack with a reduction in the shock wave strength.

The arrangement described provides a supersonic wing with a planar underwing pressure shield. This shield is based on vorticity derived from the excess energy of the propulsion system, generated by either velocity differentials or mechanical means.

Figures 12, 13:
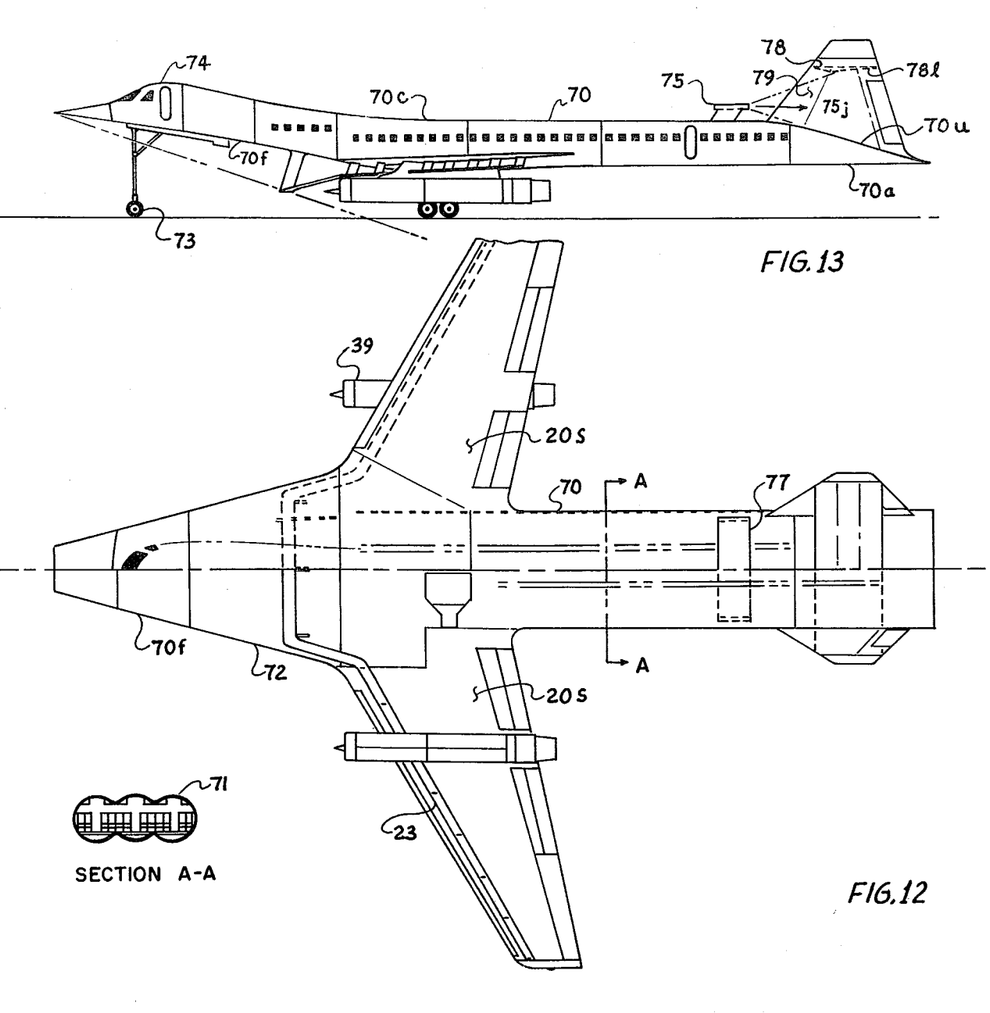
FIG. 12 is a plan view of the present wide-body supersonic aircraft illustrating in particular the spanwise manifold below the leading edge of the wing and a sectional view of the wide-body fuselage.
FIG. 13 is a side view of the aircraft of FIG. 12, illustrating the concave downward forward fuselage section and the aft concave upward fuselage closure, combined with a tail engine and concave downward horizontal stabilizer to provide an aft jet augmentation system.

The fuselage 70 of this system is likewise provided with a compatible planar configuration enabling its integration within the same underwing shield mechanism, thereby avoiding the shock wave energy loss and sonic boom normally associated with fuselage volume. A plan view of this improved energy conserving supersonic aircraft is shown in FIG. 12. The planar fuselage 70 is comprised of a plurality of adjacent circular sections 71, preferably three, joined side-by-side, providing a wide-body fuselage 70 of minimum depth. These circular sections are interconnected with partially open structure (not shown), sustaining internal pressure yet enabling lateral communication between sections, as illustrated in Section A—A of FIG. 12.

Figure 14:
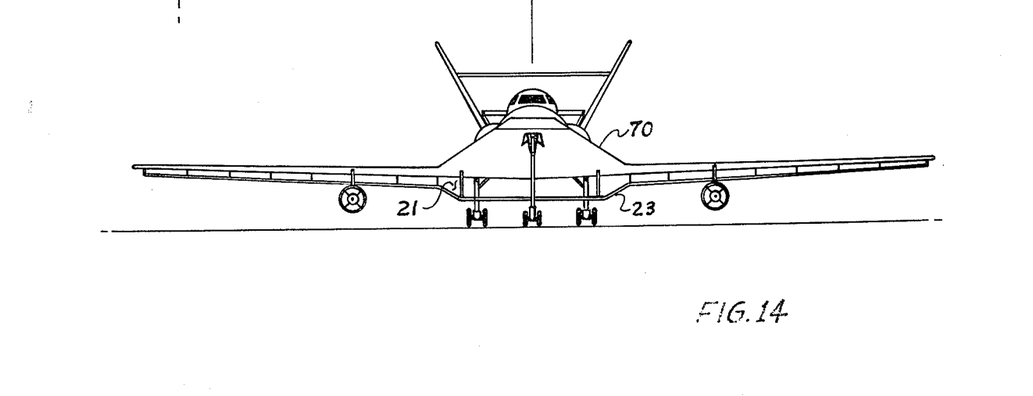
FIG. 14 is a front view of the aircraft of FIG. 12, illustrating the wide-body fuselage, and the extension of the spanwise underwing jet manifold under the fuselage.

The fuselage forward section 70f is provided by extending the leading edge 20f of the wing 20 forward and above, maintaining the same underwing camber, thereby increasing the wing thickness at the nozzle throat to the required fuselage depth, as shown in FIG. 13. This forward extension 70f contains the usual nose wheel 73 and cockpit 74. This forward planar section 70f also decreases in span going forward, thereby providing a forward delta planform. Sufficient aft sweep 72 is provided to contain the pressure generated within the surface area. This arrangement channels the forward delta underwing compression into the gap 21 above the manifold/vortex flap system 23/22, which extends across the wing center section or fuselage 70, as shown in the front view of FIG. 14.

The fuselage center section 70c is provided by a downstream continuation beyond the nozzle throat at a constant depth. However, the high pressure under the planar fuselage will then spill laterally to both sides. The adjacent portions of the wing aft surface 20s accordingly are upswept more locally to accommodate this increased flow. By this means the compression under both the wing center section/fuselage 70c and wing sides 20s expand into velocity at essentially atmospheric pressure. The fuselage 70 thereafter continues aft at its maximum depth at the nozzle throat to provide the required fuselage volume.

The fuselage aft section 70a is provided with its closure primarily in its planar upper surface 70u. A jet engine 75 is mounted in such a way that part or all of its energized fluid is discharged aft through a spanwise manifold 77 having a span essentially that of the fuselage. This engine may be either a turbojet, with or without a fan, or alternatively may be a two-dimensional or planar ramjet. Above this manifold is mounted the horizontal stabilizer 78, having a lower surface 78*l* whose aft portion 78*a* is provided with a concave downward contour. The aft portion of the fuselage upper surface 70*u* is provided with a concave upper contour. These facing contoured surfaces 78*l* and 70*u* together comprise a planar nozzle. The energized fluid 75*j* discharged from the manifold within this nozzle acts as a jet pump to energize the adjacent stream of air 79. The diverging elements of this two-dimensional nozzle provide a shroud on which the increased pressure of the augmented stream 79 acts, generating a thrust on the back side of the fuselage aft end 70*a*, in contrast to the usual reduced pressure caused by expansion of the flow around this closure. Thus the aft ends of both the fuselage and horizontal stabilizer are shaped to act in conjunction with an engine energized stream to provide a planar jet augmentation system, circumventing the usual base drag on the back end of the fuselage.

The underwing spanwise nozzle 23 may receive its energized fluid by lateral transport either from turbojet or fanjet engines pod mounted under the wing, or directly from a planar two-dimensional ramjet mounted forward of and contiguous with the discharge nozzle 23.

Figure 15:
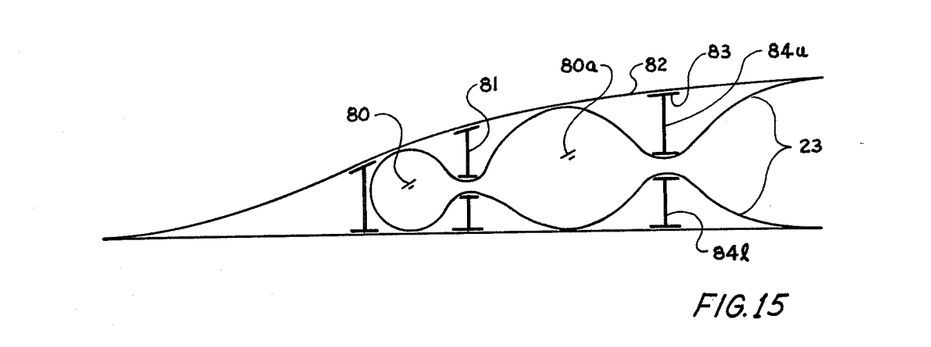
FIG. 15 is a cross sectional view of the jet manifold, comprising a spanwise duct and a contiguous converging/diverging nozzle, showing the multi-beam structure surrounding a plurality of pressurized ducts utilizing the manifold shell as beam caps thereof.

For circular gas turbine engines 39, the manifold extends laterally therefrom and includes (1) a duct 80 to transmit the pressurized air spanwise, and (2) a contiguous converging/diverging nozzle 23 to emit the pressurized air as a supersonic sheet 22 aft under the wing, as shown in the section view of FIG. 15. This duct 80 enables the fluid from the engine fan 39*f* to be transported spanwise in high pressure form, occupying minimum volume and having low velocity with reduced internal friction. The duct may include one auxiliary duct section 80*a* as shown, or additional sections as required, to enhance equilization of pressure along its length. This high pressure/low velocity duct system thereby serves as a plenum, providing a source of high pressure air uniformly across the spanwise extent to feed into the aft oriented expansion nozzle to discharge as the underwing supersonic jet sheet. Fuel may be added and burned in the plenum if desired, to increase its energy content and pressure. The manifold is supported by a series of perforated beams such as 81 between the lateral ducts 80 and 80*a*, and a pair of beams 84 in the upper and lower portions of the nozzle 23, in all cases using the external surfaces of the manifold shell 82 as the beam caps 83.

Figure 16:
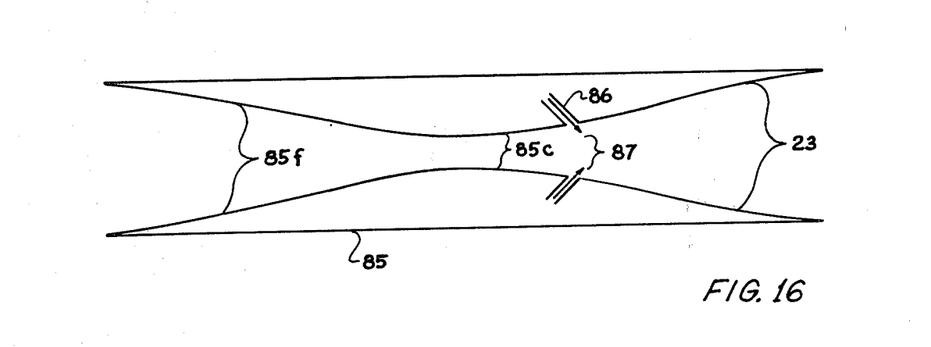
FIG. 16 is a cross sectional view of a ramjet engine, comprising a forward compression section, a center fuel burning section, and an aft engine nozzle.

For planar ramjet engines, a two-dimensional structure, as shown in FIG. 16, extends across the span of the wing 20, mounted thereunder, with the ramjet engine 85 forming a contiguous part of the nozzle 23, which now becomes the exhaust portion of the ramjet engine itself. The ramjet system thus consists of (1) a forward compression section 85*f*, (2) a center burning section 85*c*, containing fuel injection ports 86 through which fuel 87 is ejected, and (3) a diverging exhaust section 23.

It is clear that the manifold shell may be arranged so that it operates in the turbojet mode for take-off and low speed flight, but with variable geometry may operate either partially or completely as a ramjet at high supersonic speeds.

It is clear from this disclosure and its accompanying set of figures that the means of achieving efficient supersonic flight with a wide-body aircraft have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

Having thus described my invention what I claim as novel and desire to secure by Letters of Patent of the United States is:

1. In an aircraft having a wing and a nozzle, an improvement comprising:

the wing having a lower surface and an upper surface, the lower surface having a forward concave, an intermediate convex, and an aft curvature sequentially in the stream direction, the two surfaces together comprising a net positive angle of attack; and the nozzle having an outlet which is transversely elongate relative to the aircraft and an internal shape such as to expand to atmospheric pressure within the nozzle a supersonic stream of fluid with the greatest jet velocity possible from expansion, the outlet extending substantially the entire span of the leading edge of the wing, the nozzle being spaced below the leading edge and forming with the leading edge an elongate gap between the leading edge and the nozzle through which a layer of air streams at a velocity lower than nozzle stream velocity and is compressed by the wing lower surface and the nozzle stream, and a vortex flap is generated along the interface between the compressed layer of air and the nozzle stream due to their differing velocities, the compressed layer of air providing the pressure on the lower surface of the wing required for lift, whereby lift is provided at a net reduced angle of attack with less drag during supersonic flight over that experienced without the nozzle stream.

2. The improvement claimed in claim 1 wherein the nozzle forms a manifold for a plurality of jet engines.

3. The improvement claimed in claim 2 wherein the jet engines are fan jet engines and the manifold is coupled to the engines to receive fan air from the engines.

4. The improvement claimed in claim 1 wherein the nozzle is such that the supersonic stream of fluid emitted therefrom has an energy level greater than that of the compressed layer of air below the wing lower surface.

5. The improvement claimed in claim 1 wherein the aft curvature is concave.

6. The improvement claimed in claim 1 wherein the aft curvature is convex.

7. The improvement claimed in claim 1 wherein the aft curvature is flat.

8. The improvement claimed in claim 1 wherein the wing includes at least one slotted trailing edge flap and the nozzle is oriented to emit its jet at take-off speeds to effect full span slotted blown flaps for lift augmentation.

9. The improvement claimed in claim 1 wherein the nozzle has an outside shell that is flat on its bottom and concave upward on the forward portion of its top, the nozzle generating compression associated with the shell volume in the layer of air above, balancing the compression generated in the layer of air by the wing itself, and providing a channel for the underwing gap compressed air stream to proceed downstream under the convex lower wing surface and for recovery of the compression of the layer of air into velocity between the aft concave lower wing surface and the vortex flap below.

10. The improvement claimed in claim 1 wherein the nozzle outlet is intermediate between the leading edge and maximum thickness of the wing.

11. The improvement claimed in claim 1 wherein the nozzle has an outside shell located so that the supersonic stream of fluid emitted therefrom intercepts the compressed layer of air generated by the forward concave wing lower surface and a shock wave generated at the wing leading edge due to an atmospheric gust will be intercepted by the nozzle outside shell, reflected back upwards to the aft concave wing lower surface, and cancelled by expansion, whereby the energy decay into heat of the shock wave, contained within the compression layer, forms a gust alleviation or shock absorber that reduces the loads and passenger discomfort normally experienced with a conventional wing system.

12. In an aircraft having a wing and a nozzle, an improvement comprising:
the wing having a lower surface and an upper surface, the lower surface having forward concave, convex, and aft concave curvature sequentially in the stream direction, the two surfaces together comprising a net positive angle of attack; and
the nozzle having an outlet that is transversely elongate relative to the aircraft and adapted to emit a supersonic stream of fluid, the nozzle being asymmetric in vertical section and spaced below the leading edge to form an elongated gap between the leading edge and the nozzle through which a layer of air streams and is compressed by the wing lower surface, the nozzle asymmetry generating a vortex flap along the interface between the compressed layer of air and the nozzle stream that provides the pressure on the lower surface of the wing required for lift at a net reduced angle of attack with less drag during a supersonic flight.

13. The improvement claimed in claim 12 wherein the nozzle has an upper lip and a lower lip, the lower lip extending further downstream than said upper lip.

14. The improvement claimed in claim 12 wherein the nozzle has an upper section and a lower section, the upper section having an internal shape to emit therefrom a supersonic stream of fluid substantially expanded to atmospheric pressure, and the lower section having an internal shape to emit therefrom a supersonic stream of fluid at a pressure greater than atmospheric.

15. A supersonic aircraft having a trailing edge and an actuating means, an improvement comprising:
the trailing edge being movable to osicllate fore and aft, and
the actuating means providing the oscillations, with the aft motion being supersonic when the trailing edge is subsonic.

16. The improvement claimed in claim 15 wherein the aircraft has a nozzle, the nozzle containing the movable trailing edge.

17. The improvement claimed in claim 15 wherein the aircraft has a wing, the wing having an aft region that contains the movable trailing edge.

18. An improved aircraft comprising;
a fuselage having a plurality of cylindrical sections joined on their sides to provide a fuselage width in excess of its height, and
nozzle means having an outlet that is transversely elongate relative to the aircraft and operable to discharge a supersonic stream of fluid, the outlet extending at least the width of the fuselage and being spaced below the fuselage to form an elongate gap between the fuselage and the nozzle through which a layer of air streams and is compressed by the fuselage, and the nozzle means being operable to generate in a vortex flap along the interface between the compressed layer of air and the nozzle stream for providing a pressure shield below the fuselage.

19. The aircraft claimed in claim 18 wherein:
the fuselage has a forward portion, the forward portion having an upper surface, a lower surface and leading edge symmetric laterally about a midpoint, the lower surface being concave downward, the leading edge being swept aft from the midpoint.

20. The aircraft claimed in claim 18 wherein:
the fuselage has an aft portion, the aft portion having an upper surface and a lower surface, the upper surface being concave upwards in its aft extent; and
the aircraft having an aft engine, a vertical fin extending upwards from the fuselage, and a horizontal stabilizer mounted on the fin, the stabilizer having an upper surface and a lower surface, the lower surface being concave downward in its aft extent, the aft engine having a spanwise duct extending essentially the span of said fuselage through which at least a portion of its energized fluid is discharged as an aft directed jet, the an aft fuselage portion upper surface and the aft stabilizer lower surface combining with the jet to provide a jet augmentation system increasing the thrust of the engine and providing a thrust rather than a drag on the aft portion of the fuselage.

* * * * *